Patented Mar. 20, 1945

2,372,132

UNITED STATES PATENT OFFICE 2,372,132

CHROMANS AND INTERMEDIATES AND PROCESS OF PRODUCING SAME

Lee Irvin Smith, Minneapolis, Minn., and Henry C. Miller, Claymont-Wilmington, Del., assignors to Regents of the University of Minnesota, Minneapolis, Minn., a corporation of Minnesota No Drawing. Application March 19, 1942, Serial No. 435,398

10 Claims. (Cl. 260—333)

This invention relates to new methods of producing chroman compounds and to new intermediates and methods of producing the same.

The invention relates particularly to the production of 2,2-dialkyl-6-hydroxy substituted chromans, wherein such alkyl substituents may be the same or different, and is of particular significance and usefulness in production of these hydroxychromans wherein the alkyl substituents in the number 2-position differ widely, as for example, in alpha, beta and gamma tocopherols (the tocols).

It is an object of the invention to provide new methods of producing chroman compounds and particularly to methods of producing 2,2-dialkyl-6-hydroxy substituted chromans wherein said alkyl substituents may be the same or different, and to provide new procedural steps and intermediate compounds ancillary thereto.

It is a further object of the invention to provide new methods of producing the alpha, beta and gamma tocopherols (tocols) particularly alpha tocopherol, from readily available materials, and with convenience and economy.

Other and further objects of the invention are those inherent in the procedures and products illustrated, described and claimed.

As a starting ingredient in the synthesis, there is utilized, a 3,6-dialkoxy phenyl magnesium halide, structure I, having the general structure I 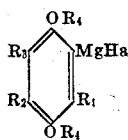

where $R_1$, $R_2$ and $R_3$ are hydrogen or alkyl, such as methyl, ethyl, butyl, propyl and the like, $R_4$ is likewise any alkyl such as methyl, ethyl, butyl, propyl or the like, and Ha is chlorine or bromine. For alpha tocopherol $R_1$, $R_2$ and $R_3$ are all methyl, whereas for beta or gamma tocopherol, one of them is hydrogen. The 3,6-dialkoxy phenyl magnesium halide may, if desired, be prepared from the corresponding ortho-unsubstituted quinone or ortho unsubstituted hydroquinone diether, as described in Example A. The 3,6-dialkoxy phenol magnesium halide, structure I, is then reacted with ethylene oxide, and the ethylene oxide product is decomposed with acid and distilled, yielding the primary alcohol structure II, which is a beta hydroxyethyl hydroquinone diether, II 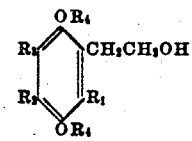

where $R_1$, $R_2$, $R_3$ and $R_4$ are as previously defined. This primary alcohol, structure II, is then reacted with a suitable halide compound such as thionyl chloride or phosphorous tribromide and is thus converted to the corresponding halide, structure III:

III 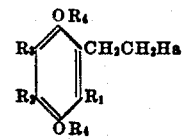

where $R_1$, $R_2$, $R_3$ and $R_4$ are the same as previously stated and Ha is chlorine or bromine. The halide then reacted with magnesium to form the corresponding Grignard reagent, structure IV:

IV 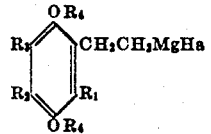

where $R_1$, $R_2$, $R_3$, $R_4$ and Ha are as previously defined. The preparation of the Grignard reagent IV is much facilitated by having present with the magnesium a low boiling point alkyl halide, such as ethyl bromide or ethyl chloride, although this is not essential for production of the Grignard.

For producing the desired 2,2-dialkyl-6-hydroxy chromans, the Grignard reagent, structure IV, is reacted with a ketone or an aldehyde having the general structure:

V 

$$R_5\text{—CO—}R_6$$

where $R_5$ and $R_6$ may be the same or different alkyl groups, or one of them may be hydrogen and the other alkyl. Exemplary ketones are acetone (where both $R_5$ and $R_6$ are methyl); methyl ethyl ketone (where $R_5$ is methyl and $R_6$ is ethyl); methyl-n-propyl ketone (where $R_5$ is methyl and $R_6$ is n-propyl); methyl-iso-butyl ketone (where $R_5$ is methyl and $R_6$ is iso-butyl). An example of the wide variation which may exist between the $R_5$ and $R_6$ alkyl radicals of the ketone is "phytol ketone," (methyl-4,8,12-trimethyl tridecyl ketone) utilized in the preparation of the tocopherol chromans in accordance with the present invention. In this ketone $R_5$ is methyl and $R_6$ is 4,8,12-trimethyl tridecyl. The formula of "phytol ketone" is

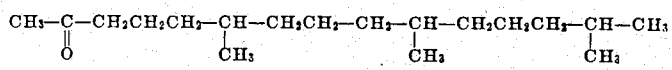

Exemplary aldehydes are acetaldehyde ($R_5$ is methyl and $R_6$ is hydrogen), propionaldehyde ($R_5$ is ethyl and $R_6$ is hydrogen) and the like.

The Grignard reagent, structure IV, and the selected ketone or aldehyde, structure V, are reacted by refluxing and then after acidification, the intermediate tertiary alcohol, structure VI, is obtained:

VI
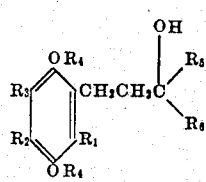

wherein $R_1$ through $R_6$ are as previously defined. The tertiary alcohol structure VI is an intermediate compound and the ether linkages in it may be smoothly de-alkylated (cleaved) and at the same time the de-alkylated product may be cyclized to the 2,2-dialkyl-6-hydroxy chroman, by refluxing with acid, in the presence of a solvent for the ingredients. The chroman VII has the structure:

VII
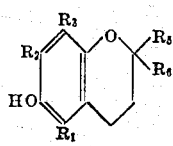

wherein $R_1$, $R_2$, $R_3$, $R_5$, and $R_6$ are as previously defined (the alkyl radical $R_4$ being cleaved and the hydroxyl reintroduced in the de-alkylation).

The foregoing procedure is illustrated by the following examples, which, however, must not be considered as limitations upon the invention claimed.

*Example A—Preparation of 3,6-dimethoxy-2,4,5-trimethyl phenylmagnesium bromide (structure I)*

A solution of 10 grams of bromopseudocumohydroquinone dimethyl ether and 3.0 cc. of ethyl bromide in 40 cc. of absolute ethyl ether was added slowly over a period of 45 minutes to 2.0 grams of magnesium. The mixture was heated under reflux throughout the course of the reaction and resulted in the production of the Grignard reagent (structure I, $R_1$, $R_2$, $R_3$, and $R_4$ being methyl and Ha being bromine).

*Example B—Preparation of the primary alcohol compound, beta-hydroxyethyl pseudocumohydroquinone dimethyl ether (structure II)*

The Grignard reagent of Example A was then preliminarily cooled by packing the flask, in which it was contained, in a salt-ice mixture. A reflux condenser attached to the flask was cooled with water having a temperature of 10° C. or less. To the Grignard in the flask, there was then added 15 grams of dry ethylene oxide, the latter being added gradually over a period of 20 minutes. The salt-ice cooling bath was then removed (the flow of water at 10° C. through the reflux condenser being continued) and the mixture refluxed spontaneously by the heat of the reaction for 45 minutes, after which heat was applied until the mixture became a thick transparent gel. Iced sulfuric acid having a concentration of 25% was then added and unchanged bromopseudocumohydroquinone dimethyl ether was removed by steam distillation at atmospheric pressure. The residue was extracted with ethyl ether and the ether then evaporated. The residual yellow oil (5.27 grams) was then dissolved in warm petroleum ether and upon cooling the beta-hydroxyethyl pseudocumohydroquinone dimethyl ether (structure II when $R_1$, $R_2$, $R_3$ and $R_4$ are methyl) crystallized out. This intermediate primary alcohol may also be designated 3,6-dimethoxy-2,4,5-trimethylbenzyl carbinol, under the Geneva nomenclature. The yield of crystallized primary alcohol intermediate was 2.7 grams and had a melting point of 69.5–72°C. After several crystallizations from a mixture of ethyl and petroleum ethers, the primary alcohol (II) melted at 73.5–75° C. The yield was better in larger runs than in smaller runs, reaching 29.4 grams (62%) when 55 grams (0.246 mole) of the bromopseudocumohydroquinone dimethyl ether was used in preparing the Grignard reagent of Example A.

*Example C—Preparation of beta-(3,6-dimethoxy-2,4,5-trimethylphenyl) ethyl chloride (structure III)*

Thionyl chloride (14.8 grams) dissolved in dry benzene (10 cc.) was added to a solution of 18 grams of the carbinol intermediate, beta-hydroxyethyl pseudocumohydroquinone dimethyl ether, of Example B, dissolved in 30 cc. of benzene. There was an immediate evolution of gas. The mixture was refluxed for three hours, then cooled and washed successively, twice with water, once with saturated sodium bicarbonate and again with water. The benzene solvent was then distilled off at atmospheric pressure and a red oil remained. The red oil was distilled at 3–4 mm. of mercury pressure, leaving 5 to 8 grams of black tarry material. The distillate (14.26 grams) was a light yellow oil which boiled at 130–138° C. under 3 to 4 mm. of mercury pressure. The distillate, after crystallization twice from methanol, yielded 8.0 grams of pure white material having a melting point of 61.5° C. and 1.1 grams of less pure material, a total of 9.1 grams or 41% yield.

The product, beta-(3,6-dimethoxy-2,4,5-trimethyl phenyl) ethyl chloride has the structure III when the $R_1$, $R_2$, $R_3$ and $R_4$ are methyl and Ha is chlorine.

*Example D—Preparation of beta-(3,6-dimethoxy-2,4,5-trimethylphenyl) ethyl bromide (structure III)*

Eight grams of the primary alcohol intermediate, namely beta-hydroxymethyl pseudocumohydroquinone dimethyl ether, of Example B, was dissolved in 100 cc. of petroleum ether having a boiling point of 30–60° C., and the solution was cooled to 0° C. The cooling bath was maintained around the flask containing the primary alcohol-petroleum ether solution, and a solution of 11.4 grams of phosphorous tribromide in 100 cc. of petroleum ether was added slowly over a period of twenty minutes, the solutions being continuously stirred and cooled. The cooling bath was removed and the mixture was allowed to reach room temperature 18° to 20° C., and stand for ten hours. The mixture was then refluxed for thirty minutes, after which 40 cc. of water was cautiously added in small portions. 100 cc. of ethyl ether was then added and the organic layer was washed successively with water, aqueous sodium bicarbonate and again with water, and then dried with sodium sulfate. Removal of the solvent by distillation at atmospheric pressure left 5.5 grams of a yellow oil which was crystallized from methanol. There resulted 2.8 grams (yield 28%) of white platelets, which, after several crystallizations, melted at 66°–67° C.

The white platelet crystalline product, beta-(3,6-dimethoxy-2,4,5-trimethyl phenyl) ethyl bromide has the Structure III, $R_1$, $R_2$, $R_3$ and $R_4$, in this instance, being methyl and Ha being bromine.

*Example E—Preparation of 2,2,5,7,8-pentamethyl-6-hydroxychroman (structure VII when $R_1$, $R_2$, $R_3$, $R_5$ and $R_6$ all are methyl), and esters thereof*

Magnesium turnings (0.3 gram) was activated by reaction with 0.07 gram of ethyl bromide in 1.0 cc. of ethyl ether and to the thus activated magnesium, there was added a solution of 1.21 grams of beta-(3,6-dimethoxy-2,4,5-trimethyl phenyl) ethyl chloride from Example C, in 2 cc. of ethyl ether, the solution of chloride being added slowly. The mixture was refluxed for five hours after all the chloride was added, and became quite thick with a suspended white solid. The mass was allowed to stand five hours at room temperature (18°–21° C.). The thus produced Grignard reagent (structure IV, $R_1$, $R_2$, $R_3$ and $R_4$ being methyl and Ha being bromine) was then reacted with acetone (structure V, $R_5$ and $R_6$ being methyl), 2.00 cc. of acetone being added slowly to the solid Grignard reagent mass. The solid dissolved, and after refluxing fifteen minutes, the mixture was decomposed by addition of dilute sulfuric acid. The resultant liquid mass separated into aqueous and ether layers. The aqueous layer was separated and extracted with ethyl ether and the ether extraction was combined with the ether layer and the whole dried with magnesium sulfate. The ethyl ether solvent was then removed by distillation at atmospheric pressure, yielding a residual oil, the intermediate tertiary alcohol (structure VI where all R's are methyl).

This intermediate carbinol compound was then refluxed for two hours with 10 cc. of acetic acid and 4 cc. of 40% hydrobromic acid, in order to cleave the remaining ether group and cyclize to the hydroxy chroman. The cooled mixture was diluted with water and the resulting solid removed and purified by crystallizing from methanol. The resulting 2,2,5,7,8-pentamethyl-6-hydroxychroman weighed 0.21 gram and melted at 86.5°–94° C. alone or when mixed with an authentic specimen.

This chroman was treated with 3,5 dinitrobenzamide and gave a 3,5-dinitrophenylurethane which ester melted at 203–206° C. alone or when mixed with an authentic specimen.

*Example F—Preparation of 2-ethyl-2,5,7,8-tetramethyl-6-hydroxy chroman (structure VII when $R_5$ is methyl and $R_6$ is ethyl) and 3,5-dinitrophenylurethane ester thereof*

As in Example E, 0.6 gram of magnesium turnings was activated with 1.09 grams of ethyl bromide in 8.00 cc. of ethyl ether and to the thus activated magnesium there was added 2.42 grams of beta-(3,6-dimethoxy-2,4,5-trimethylphenyl) ethyl chloride, of Example C. The procedure was carried out as in Example E, to the production of the Grignard reagent (structure IV, $R_1$, $R_2$, $R_3$ being methyl and Ha being chlorine.)

The Grignard reagent thus produced was then reacted with 3.0 grams of methylethylketone under the conditions specified in Example E except that after decomposition of the Grignard reagent by reaction with the ketone, all material volatile with steam was removed. The non-volatile portion, i. e., the intermediate carbinol compound (structure VI, where $R_1$, $R_2$, $R_3$ and $R_5$ are methyl and $R_6$ ethyl), was demethylated (i. e., "cleaved") and cyclized as set forth in Example E, and the resultant crude chroman distilled in a Hickman-type still (bath temperature, 160°–170° C.; pressure 9–10 mm. of mercury pressure). The resultant partially purified chroman was a yellow oil; yield, 0.63 gram, was rubbed with petroleum ether (B. P. 28–38°) and was then crystallized out. After recrystallization from the same solvent, the resultant chroman 2-ethyl-2,5,7,8-tetramethyl-6-hydroxy chroman, remained as a white substance having a melting point of 60.5°–62.5° C.

The 3,5-dinitrophenylurethane was prepared from the chroman of this example and had a melting point of 200–201.5° C.

*Example G — 2-n-propyl-2,5,7,8-tetramethyl-6-hydroxy chroman (structure VII where $R_1$, $R_2$, $R_3$ and $R_5$ are methyl and $R_6$ is n-propyl)*

The reagents used were 1.21 grams of the intermediate compound, beta-(3,6-dimethoxy-2,4,5-trimethylphenyl) ethyl chloride of Example C; 0.55 gram ethyl bromide; 2.0 cc. of ethyl ether; 0.30 gram of magnesium, and 1.22 grams of methyl-n-propylketone. These were processed as in Example F, including the steam distillation. The resulting crude chroman was purified by distillation in a Hickman-type still (bath temperatures 160°–170° C.; pressure 8 to 10 mm. of mercury pressure) and yielded a distillate of 0.32 gram of the yellow oil chroman. After crystallization from petroleum ether, the melting point of the resultant solid chroman was 57° to 59° C. The resulting chroman (structure VII where $R_1$, $R_2$, $R_3$ and $R_5$ are methyl and $R_6$ is normal propyl) illustrates the diversity of alkyl substituents in the $R_5$ and $R_6$ positions, which may be achieved by the methods of the present invention.

*Example H — 2-iso-butyl-2,5,7,8-tetramethyl-6-hydroxy chroman (structure VII when $R_1$, $R_2$, $R_3$ and $R_5$ are methyl and $R_6$ is iso-butyl)*

The reagents used were 2.42 grams of the intermediate compound, beta-(3,6-dimethoxy-2,4,5-trimethylphenyl) ethyl chloride of Example C: 0.6 gram of ethyl bromide; 8.0 cc. of ethyl ether; 0.6 gram of magnesium and 3.2 grams of methyl-iso-butyl ketone. These were processed as in Example F, and after distillation there was obtained 1.19 grams of the semi-purified yellow oil chroman. Upon crystallization from petroleum ether, there was obtained a solid white chroman compound, having a melting point of 42.5° to 44.5°. The 3,5-dinitrophenylurethane ester of this chroman melted at 188°–190° C.

*Example I—Alpha tocopherol (structure VII when $R_5$ is methyl and $R_6$ is*

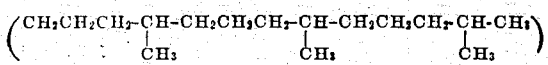

For the preparation of this material 0.90 gram (0.038 mole) of magnesium was placed in a three-necked flask equipped with a stirrer dropping funnel and reflux condenser. A drop of ethyl bromide and a little ethyl ether (0.5 cc.) were added. As soon as the reaction began, the stirrer was started and 4.7 grams (0.0195 mole) of the intermediate compound, beta-(3,6-dimethoxy 2,4,5-trimethylphenyl) ethyl chloride in 10 cc. of ethyl ether was slowly added by way of the dropping funnel over a period of two hours, during which time the mixture was gently refluxed. Refluxing was continued for four hours after all of the intermediate compound was added, and as a result there was formed a thick precipitate suspension of the Grignard reagent (structure IV when $R_1$, $R_2$, $R_3$ and $R_4$ are methyl and Ha is chlorine).

The thick precipitate suspension of the Grignard reagent was cooled to 0° C. and to it was added 4 grams (0.015 mole) of "phytol ketone" (structure V where $R_5$ and $R_6$ are as above defined in this example). The precipitate dissolved, and after refluxing for one hour, the mixture was allowed to cool.

Dilute hydrochloric acid was then carefully added to the cool mixture. Sometimes, but not always, a small amount (about 0.25 gram) of a solid having an M. P. of 160–161° C. appears at this point in the process, and is the 1,4-diphenylbutane corresponding to structure III and results from a coupling reaction. After removal of this solid (if any), the mixture was steam distilled and the distillate (750 cc.) was discarded. The residue was thoroughly extracted with ethyl ether and the ether solution was washed with water and dried with magnesium sulfate. The ether was then removed by distillation at atmospheric pressure and left the carbinol intermediate compound (structure VI where $R_5$ is methyl and $R_6$ is 4,8,12-trimethyl-tridecyl). The yield was 5.83 grams; 77%.

The carbinol intermediate compound was then demethylated ("cleaved") and cyclized by refluxing it for nine hours under an atmosphere of nitrogen and in the presence of 70 cc. of acetic acid containing 6.0 grams of dry hydrogen bromide. Water (2 volumes) was then added and the mixture extracted three times with ethyl ether. The combined ether extracts were washed four times with water, twice with saturated sodium bicarbonate, and once again with water. After drying with magnesium sulfate, the ethyl ether solvent was evaporated.

The residual red oil (5.45 grams) was refluxed for one hour in a nitrogen atmosphere with 50 cc. of ethanol in which 0.5 gram of sodium had been dissolved. The solution was diluted with two volumes of water and extracted three times with ether. After washing twice with water, the ether solution was dried with magnesium sulfate and the ether solvent evaporated off. The residual red oil weighed 4.69 grams (yield 72%) and was crude alpha tocopherol.

While the red color of the crude alpha tocopherol could not be entirely removed by shaking with activated alumina (Brockman method) followed by high vacuum distillation, a specimen so treated had a carbon and hydrogen analysis very close to theoretical values for alpha tocopherol. The red color could be removed by boiling the substance in dioxan (10 cc.) with stannous chloride (1.0 gram) and hydrochloric acid (3 cc.), but the product, though yellow and giving good analytical values, was shown by polarographic analysis to be quite impure (52.7%).

A feasible method of purification involves conversion of the crude red oil tocopherol to tocopherolquinone, reducing this to the hydroquinone, and cyclization of the pure tocopherol hydroquinone to alpha tocopherol, according to the method of Tischler and Wendler, J. A. C. S. 60, 700 (1938).

Utilizing this method, the 4.69 grams of crude red oil tocopherol of this example was converted into 1.06 grams (20%) of pure alpha tocopherol, and 2.63 grams of a red oil, probably the partially demethylated carbinol (structure VI) or its dehydration product. This red oil was not investigated further. The 1.06 grams of pure alpha tocopherol was utilized for the following identity tests.

*The 3,5-dinitrophenylurethane.*—This derivative was prepared in 69% yield, the crude derivative melting at 141.5–155° C. After one recrystallization from ethanol, it melted at 142.5–144.5° C., alone or when mixed with an authentic specimen (M. P. 143–145°).

*Polarographic analysis.*—The buffer in this analysis had a pH of 4.03 and was 0.1 N aniline, 0.1 N anilinium perchlorate in ethanol, 75% by volume. According to this analysis, the purity of the alpha tocopherol prepared in accordance with this invention was 97.2% (limit of experimental error according to this analysis being 3%).

*Emmerie and Engel titration.*—Duplicate determinations indicate that the sample was 100% alpha tocopherol within the experimental error of the method.

*Ultraviolet absorption spectrum.*—The graph corresponded quite closely to the standard graph for alpha tocopherol, the only difference being a slight disparity in the height of the minimum, a matter of little significance.

*Biological assay.*—When the alpha tocopherol was fed at a level of 6 mg. to each of eight properly conditioned female rats, there were no resorptions and 100% of good litters averaging 8.4 young each of average weight 5.8 grams were dropped. When fed to each of eight rats at a level of 3 mg. one failed implantation, two resorbed and five littered (71% of 7). The litters averaged seven young each of average weight 5.3 grams. Since the usual specimen of authentic alpha tocopherol shows 50% activity at the 3 mg. level, these results demonstrate that this sample is in every way equal in biological activity to natural alpha tocopherol and to alpha tocopherol synthesized from phytol.

Many obvious variations will be apparent to those skilled in the art and such are intended to be within purview of the invention described and claimed.

What we claim is:

1. The method of making tocopherol-like chroman compounds which comprises reacting a Grignard reagent having the structure

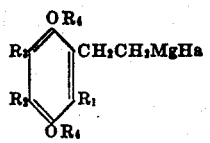

where $R_1$, $R_2$ and $R_3$ are selected from the group consisting of hydrogen and alkyl, $R_4$ is alkyl and Ha is selected from the group consisting of bromine and chlorine, with a composition having the structure

where one of the radicals in the structure $R_5$—CO—$R_6$ is alkyl and the other of said radicals is selected from the group consisting of hydrogen and alkyl, and refluxing the resultant tertiary alcohol under acidic conditions to de-alkylate the ether linkages thereof and cyclize to the corresponding 6-hydroxy chroman.

2. The method of making chroman compounds which comprises reacting a Grignard reagent having the structure

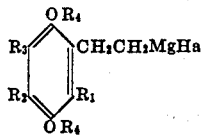

where $R_1$, $R_2$, and $R_3$ are selected from the group consisting of hydrogen or alkyl, $R_4$ is alkyl and Ha is selected from the group consisting of bromine or chlorine, with an aldehyde having the structure

where $R_6$ is alkyl, and refluxing the resultant tertiary alcohol under acidic conditions to de-alkylate the ether linkages thereof and cyclize to the corresponding 6-hydroxy chroman.

3. The method of making tocopherol-like chroman compounds which comprises reacting a Grignard reagent having the structure

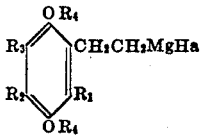

where $R_1$, $R_2$ and $R_3$ are selected from the group consisting of hydrogen or alkyl, $R_4$ is alkyl and Ha is selected from the group consisting of bromine and chlorine, with a ketone having the structure

where $R_5$ and $R_6$ are selected from the group consisting of like and different alkyl groups and refluxing the resultant tertiary alcohol under acidic conditions to de-alkylate the ether linkages and cyclize to the corresponding 6-hydroxy chroman.

4. The process of making tocopherol-like chromans which comprises reacting beta-(3,6-dialkoxy methylphenyl) ethyl magnesium halide with methyl-4,8,12-trimethyl tridecyl ketone and thereafter refluxing the resultant tertiary alcohol under acidic conditions to de-alkylate the ether linkages thereof and cyclize to the corresponding 6-hydroxy tocopherol-like chroman.

5. The process of making alpha tocopherol which comprises reacting beta-(3,6-dialkoxy-2,4,5-trimethyl phenyl) ethyl magnesium halide with methyl-4,8,12-trimethyl tridecyl ketone and thereafter refluxing the resultant tertiary alcohol under acidic conditions to de-alkylate the ether linkages and cyclize to alpha-tocopherol.

6. The method of making tocopherol-like chroman compounds which comprises reacting a 3,6-dialkoxy phenyl magnesium halide with ethylene oxide, acidifying and extracting the resultant beta-hydroxyethyl hydroquinone diether, reacting said diether with a compound selected from the class consisting of thionyl chloride and phosphorous tribromide, reacting the resultant compound with magnesium to form the corresponding beta-(3,6-dialkoxy-phenyl) ethyl magnesium halide, refluxing the latter with a compound having the structure

where one of the radicals in the structure $R_5$—CO—$R_6$ is alkyl and the other of said radicals is selected from the group consisting of hydrogen and alkyl, and refluxing the resultant tertiary alcohol under acidic conditions to de-alkylate the ether linkages of said tertiary alcohol and cyclize to the corresponding 6-hydroxy chroman.

7. The method of making alpha tocopherol which comprises reacting 3,6-dialkoxy-2,4,5-trimethyl phenyl magnesium halide with ethylene oxide, acidifying and extracting the resultant beta hydroxy ethyl trimethyl hydroquinone diether, reacting said diether with a compound selected from the class consisting of thionyl chloride and phosphorous tribromide, reacting the resultant compound with magnesium to form the corresponding beta-(3,6-dialkoxy-2,4,5-trimethyl phenyl) ethyl magnesium halide, refluxing the latter with methyl-4,8,12-trimethyl tridecyl ketone to form the corresponding tertiary alcohol, and refluxing said tertiary alcohol under acidic conditions to de-alkylate the ether linkages thereof and cyclize to alpha tocopherol.

8. The method of making alpha tocopherol which comprises reacting 3,6-dialkoxy-2,4,5-trimethyl phenyl magnesium halide with ethylene oxide, acidifying and extracting the resultant beta hydroxy ethyl trimethyl hydroquinone diether, reacting said diether with thionyl chloride in benzene, reacting the resultant compound with magnesium in the presence of a low-boiling point alkyl halide to form the corresponding beta-(3,6-dialkoxy-2,4,5-trimethyl phenyl) ethyl magnesium chloride, refluxing the latter with methyl-4,8,12-trimethyl tridecyl ketone to form the corresponding tertiary alcohol, and refluxing said tertiary alcohol under acidic conditions to de-alkylate the ether linkages and cyclize to the desired alpha tocopherol.

9. The method of making alpha tocopherol which comprises reacting 3,6-dialkoxy-2,4,5-trimethyl phenyl magnesium halide with ethylene oxide, acidifying and extracting the resultant beta hydroxy ethyl trimethyl hydroquinone diether, reacting said diether with thionyl chloride in ethyl ether, reacting the resultant compound with magnesium in the presence of a low-boiling point alkyl halide to form the corresponding beta-(3,6-dialkoxy-2,4,5-trimethyl phenyl) ethyl magnesium chloride, refluxing the latter with methyl-4,8,12-trimethyl tridecyl ketone to form the corresponding tertiary alcohol, and refluxing said tertiary alcohol under acidic conditions to de-alkylate the ether linkages and cyclize to the desired alpha tocopherol.

10. The method of making alpha tocopherol which comprises reacting 3,6-dialkoxy-2,4,5-trimethyl phenyl magnesium halide with ethylene oxide, acidifying and extracting the resultant beta hydroxy ethyl trimethyl hydroquinone diether, reacting said diether with phosphorous tribromide, reacting the resulting compound with magnesium in the presence of ethyl bromide to form the corresponding beta-(3,6-dialkoxy-2,4,5-trimethyl phenyl) ethyl magnesium bromide, refluxing the latter with methyl-4,8,12-trimethyl tridecyl ketone to form the corresponding tertiary alcohol, and refluxing said tertiary alcohol under acidic conditions to de-alkylate the ether linkages thereof and cyclize to the desired alpha tocopherol.

LEE IRVIN SMITH.
HENRY C. MILLER.